R. D. MERSHON AND P. A. ROSS.
WELDING CONDENSER PARTS.
APPLICATION FILED DEC. 8, 1919.
1,350,557.
Patented Aug. 24, 1920.
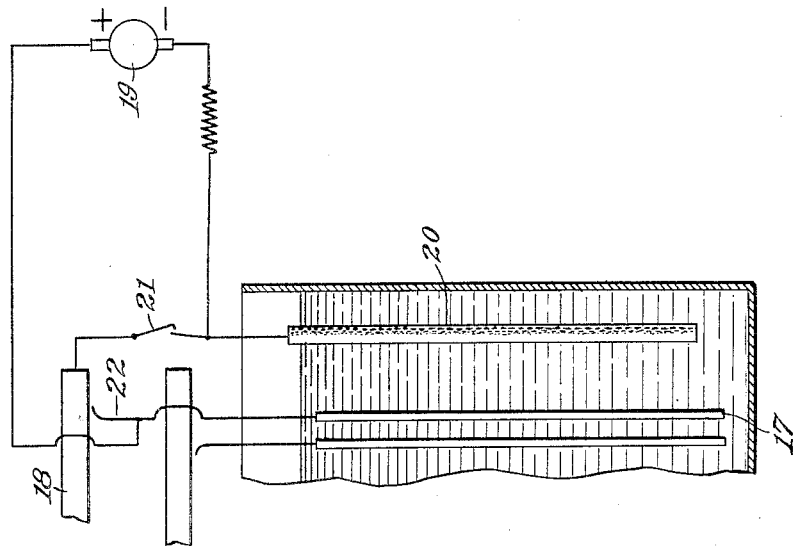
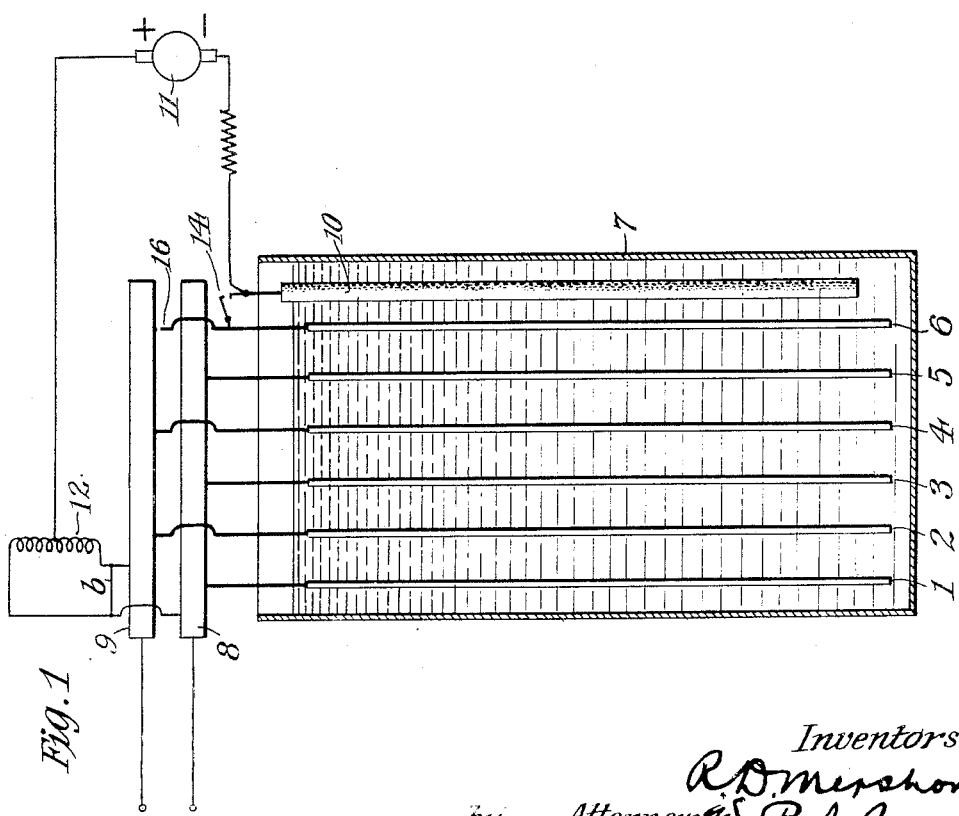
Inventors
R. D. Mershon
P. A. Ross
by Attorneys
Kerr, Page, Cooper & Hayward

UNITED STATES PATENT OFFICE.

RALPH D. MERSHON, OF NEW YORK, N. Y., AND PERCY A. ROSS, OF NORWALK, CONNECTICUT; SAID ROSS ASSIGNOR TO SAID MERSHON.

WELDING CONDENSER PARTS.

1,350,557.  Specification of Letters Patent.  Patented Aug. 24, 1920.

Application filed December 8, 1919. Serial No. 343,267.

*To all whom it may concern:*

Be it known that we, RALPH D. MERSHON and PERCY A. ROSS, both citizens of the United States, residing at New York, county of New York, and Norwalk, county of Fairfield, and State of Connecticut, respectively, have invented certain new and useful Improvements in Welding Condenser Parts, of which the following is a full, clear, and exact description.

This invention relates to welding metals, particularly for making welded connections between the metal plates or electrodes (usually aluminum), of an electrolytic condenser, and some other metal part or parts, for example the busbars or other conductors by which the condenser is connected with the external circuit, and the chief object of the invention is to provide a method by which such welds can be made quickly and conveniently in the field or in other situations where special apparatus for welding is not available.

In the prior patent of Ralph D. Mershon, No. 1,269,726, there is described a method of welding in which the parts to be welded are placed together and connected to one terminal of a suitable source of current, preferably a charged condenser, after which the other terminal of the source is brought into contact with the joint at the point where the weld is to be made. The resulting rush of current between the joint and the contacting terminal fuses the parts together, the operation being repeated as often as may be necessary to produce a weld of the desired area.

Our present method is in the nature of an improvement on the above scheme, and in making repairs in a condenser permits the use of the condenser itself as the source of welding current.

In the accompanying drawing, Figure 1 illustrates diagrammatically an electrolytic condenser in which the terminal of one of the electrodes is to be welded to its bus-bar.

Fig. 2 is a diagram illustrating the method of welding when all the electrodes are disconnected from the bus-bars.

The condenser shown in Fig. 1 consists of electrodes 1, 2, 3, 4, 5, 6, immersed in a suitable electrolyte in a vessel or tank 7. Electrodes 1, 3 and 5 are connected to a bus-bar 8, and 2 and 4 to bus-bar 9. The terminal of electrode 6 has, it is assumed, been accidentally detached from bus-bar 9, and is to be welded thereto. The condenser illustrated is one of the excited type, that is, it has a cathode 10, composed of conducting material which does not become coated with an insulating film, for example carbon or nickel, which cathode is connected to the negative pole of a source of unidirectional current 11, the positive pole being connected to the neutral point of a balance coil 12 which is itself connected across the bus-bars 8, 9, to which the anodes are connected.

To make the desired weld, a temporary connection is provided between the disconnected anode 6 and the negative pole of the exciting source as by means of a switch 14 between the anode and the cathode 10, and the balance coil B is temporarily short-circuited, as by a wire $b$, or the source is connected directly to the bus-bars by a wire not shown. These connections, and the connections between the switch and the anode and cathode, are preferably made with good electrical contact, so that the resistance at such points will be small. The switch being closed, it will be seen that the positive terminal of the source 11 is connected with the anodes 1, 2, 3, 4, 5, and the negative pole with the cathode and the disconnected anode 6. Since, from the nature of the electrolytic condenser, current cannot flow from the film-coated electrodes or anodes to the electrolyte, anodes 1, 2, 3, 4 and 5 and the electrolyte constitute a condenser (in parallel with the source 11) which receives a charge from such source,—anodes 1, 2, 3, 4 and 5 having a positive charge and the electrolyte a negative charge. The disconnected terminal 16 of anode 6 is now brought into contact with bar 9 at the point where the desired weld is to be made, whereupon the condenser discharges through switch 14 and the point where terminal 16 touches the bar. The rush of current at this latter point develops a high temperature at the instant of discharge, which fuses the two parts together.

Another method is to leave the switch 14 open and place the terminal 16 in contact with the bar 9 at the point where the weld is to be made. The switch is then closed, whereupon the condenser is instantly discharged across the joint between terminal 16 and the bar. The sudden rush of current across this point of poor conductivity raises the temperature at such point sufficiently to fuse the terminal and the bar together.

The desired weld having been made, the connection between the anode 6 and the source 11 is broken, by removing the switch 14, and wire $b$ is removed, thus restoring the condenser to condition for use on an alternating current circuit.

It may happen that all the electrodes (or anodes) are disconnected from the bus-bars, in which case one of the anodes will have to be welded to its bus-bar while the others are disconnected, as in Fig. 2. In this case, as in the other method described above, the electrolyte constitutes in effect one electrode of the condenser and the plate or anode 17 (which is assumed to be the one which is to be welded first) constitutes another electrode. To make the desired weld, say to the busbar 18, the electrolyte is connected to the negative pole of the source 19 through the medium of the cathode 20, and between the latter and busbar 18 is connected a switch 21, while the terminal 22 is connected to the positive pole of the source. Placing the terminal 22 on the busbar at the point where it is to be welded thereto, the switch 21 is closed. This discharges the condenser through the joint between the busbar 18 and terminal 22. Or the switch can be closed and the terminal brought into contact with the busbar, as in the method first described. One anode having been welded to its busbar the other anodes can then be welded by the method illustrated in Fig. 1.

If convenient, the anode which is to be welded to the busbar or to some other metal part or piece, can be removed from the electrolyte while the welding by the first method is being effected.

It is understood that the invention is not confined to the exact conditions herein set forth. For example the method is not limited to welding a detached terminal to its bus-bar, but can be used to make welds at other points in the system.

We claim:

1. The method of making a welded connection between the terminal of an electrode of a condenser and a bus-bar to which one or more other electrodes of the condenser are connected, the method comprising charging the condenser and discharging it through the joint between the terminal of the electrode and the bus-bar.

2. The method of making a welded connection between the terminal of an electrode of a condenser and a bus-bar to which one or more other electrodes of the condenser are connected, the method comprising connecting the electrode to one pole of a source of charging current and the bus-bar to the other pole, and discharging the condenser through the joint between the terminal of the electrode and the bus-bar.

3. The method of making a welded connection between the terminal of an anode of an excited electrolytic condenser and a bus-bar thereof to which one or more other anodes of the condenser are connected, comprising connecting the anode to the negative pole of the exciting source, and discharging the condenser across the joint between the terminal of the anode and the bus-bar.

4. The method of making a welded connection between the terminal of an electrode of a condenser and a bus-bar thereof to which one or more other electrodes are connected, comprising placing the terminal of the anode in contact with the bus-bar at the point where the weld is to be made, charging the condenser, and discharging it through the joint between the said terminal and the bus-bar.

5. The method of making a welded connection between the terminal of an electrode of a condenser and a bus-bar thereof to which one or more other electrodes are connected, comprising placing the terminal of the anode in contact with the bus-bar at the point where the weld is to be made and connecting the bus-bar and the said terminal in series in an open circuit through a source of charging current, and then closing the said circuit to discharge the condenser through the joint between the said terminal and the bus-bar.

6. The method of making a welded connection between the terminal of an electrode of a condenser and a bus-bar thereof, comprising connecting the condenser in parallel with a source of charging current and discharging the condenser through the joint between the terminal of the electrode and the bus-bar.

In testimony whereof we hereunto affix our signatures.

RALPH D. MERSHON.
PERCY A. ROSS.